United States Patent
Jungerman

(10) Patent No.: US 7,609,758 B2
(45) Date of Patent: Oct. 27, 2009

(54) METHOD OF PHASE SHIFTING BITS IN A DIGITAL SIGNAL PATTERN

(75) Inventor: Roger L. Jungerman, Petaluma, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 714 days.

(21) Appl. No.: 10/836,178

(22) Filed: Apr. 30, 2004

(65) Prior Publication Data

US 2005/0243960 A1 Nov. 3, 2005

(51) Int. Cl.
*H04B 3/46* (2006.01)

(52) U.S. Cl. ............................ 375/226; 324/763

(58) Field of Classification Search ............ 375/371, 375/226, 224; 324/500, 512, 521, 523, 527, 324/535, 763, 76.77–76.83, 86, 612, 613, 324/617, 622; 370/241–253; 455/67.11–67.7, 455/115.1–115.4, 226.1–226.4
See application file for complete search history.

(56) References Cited

U.S. PATENT DOCUMENTS

| | | | | |
|---|---|---|---|---|
| 4,859,972 A | * | 8/1989 | Franke et al. | 333/164 |
| 5,124,707 A | * | 6/1992 | Stove | 341/157 |
| 5,515,404 A | * | 5/1996 | Pearce | 375/371 |
| 5,546,432 A | * | 8/1996 | Waters | 375/372 |
| 5,856,804 A | * | 1/1999 | Turcotte et al. | 342/371 |
| 6,076,175 A | * | 6/2000 | Drost et al. | 714/704 |
| 6,625,560 B1 | * | 9/2003 | Molla et al. | 702/120 |
| 6,847,247 B2 | * | 1/2005 | Jones et al. | 327/291 |
| 6,885,209 B2 | * | 4/2005 | Mak et al. | 324/763 |
| 7,047,457 B1 | * | 5/2006 | Black et al. | 714/712 |
| 2002/0171446 A1 | * | 11/2002 | Takechi et al. | 324/765 |
| 2003/0006795 A1 | * | 1/2003 | Asayama et al. | 324/763 |
| 2005/0152488 A1 | * | 7/2005 | Buckwalter et al. | 375/350 |

OTHER PUBLICATIONS

Owen, David, Application Note: Understanding Your Signal Generator Output Specification, 2001, IFR Systems Inc., Issue 1, p. 7.*

* cited by examiner

*Primary Examiner*—Shuwang Liu
*Assistant Examiner*—David Huang

(57) ABSTRACT

A method of phase shifting bits in a digital signal pattern combines a bit-wise phase-shift signal with an external clock signal to produce a perturbed clock signal. The perturbed clock signal is provided to a digital pattern source to generate a shifted digital signal pattern wherein at least one bit is selectively phase-shifted according to the bit-wise phase-shift signal.

15 Claims, 4 Drawing Sheets

METHOD OF PHASE SHIFTING BITS IN A DIGITAL SIGNAL PATTERN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

Jitter is the deviation from an ideal timing edge of the actual timing edge in a sequence of data bits that occurs at high frequencies (typically at frequencies greater than the bit rate divided by 2,500; however, other definitions of jitter, such as timing errors occurring above 10 MHz or timing errors that are not tracked by clock recovery). Jitter in a digital system is essentially a timing error that can affect the timing allocation within a bit cell. Jitter is typically measured at the differential zero crossings for balanced electrical signals, at the average voltage level for unbalanced signals, and at the average optical power level for optical signals. Jitter is often used as a figure of merit, and tracking jitter-induced errors over a period of time can provide an indication of system stability.

There are various types of jitter, such as random jitter, periodic jitter, and data-dependent jitter ("DDJ"). DDJ produces different amounts of jitter for different digital outputs. For example, a digital output of "00010001" would have a different amount of DDJ than a digital output of "11001100" from the same digital source because the latter digital output has more transitions, and hence contains more high-frequency components in its spectrum. The digital patterns with higher frequency content will be attenuated and phase shifted relative to the lower frequency patterns. Determining the level(s) and type(s) of jitter are important in characterizing components used in digital systems. In general, digital systems having higher transmission rates (typically expressed in Mb/s or Gb/s) have timing margins that are less tolerant to jitter.

There are a variety of techniques and instruments used for measuring jitter, such as real-time high-speed oscilloscopes, time sampling oscilloscopes, time interval analyzers, bit error ratio testers ("BERTs"), and digital communication analyzers ("DCAs"); however, different techniques often do not show good agreement. In other words, the jitter measured using one technique does not equal the jitter measured using another technique.

Variations in the frequency response of the test system can affect the measured jitter. For example, a test pattern source might have an output amplifier with a bandwidth that limits high-frequency components of jitter, or the test pattern source might have significant unquantified jitter. Similarly, the test receiver might contribute uncalibrated jitter that dominates a jitter measurement.

In telecommunications (e.g. SONET/SDH/OTN) and enterprise (e.g. Ethernet) applications, jitter specifications and measurements are documented through standards bodies. In the high-speed I/O arena, many new bus standards are being introduced with little commonality in specifying and measuring jitter. Similarly, characterization of high-speed serial electrical backplanes is gaining increased attention as their use increases for high-bandwidth interconnections. Jitter is often the limiting factor for electrical backplanes operating in the 1-10 Gb/s range.

BRIEF SUMMARY OF THE INVENTION

A method of phase shifting bits in a digital signal pattern combines a bit-wise phase-shift signal with an external clock signal to produce a perturbed clock signal. The perturbed clock signal is provided to a digital pattern source to generate a shifted digital signal pattern wherein at least one bit is selectively phase-shifted according to the bit-wise phase-shift signal.

DETAILED DESCRIPTION OF THE EMBODIMENTS

I. An Exemplary Jitter Reference Source

Figure 1A:
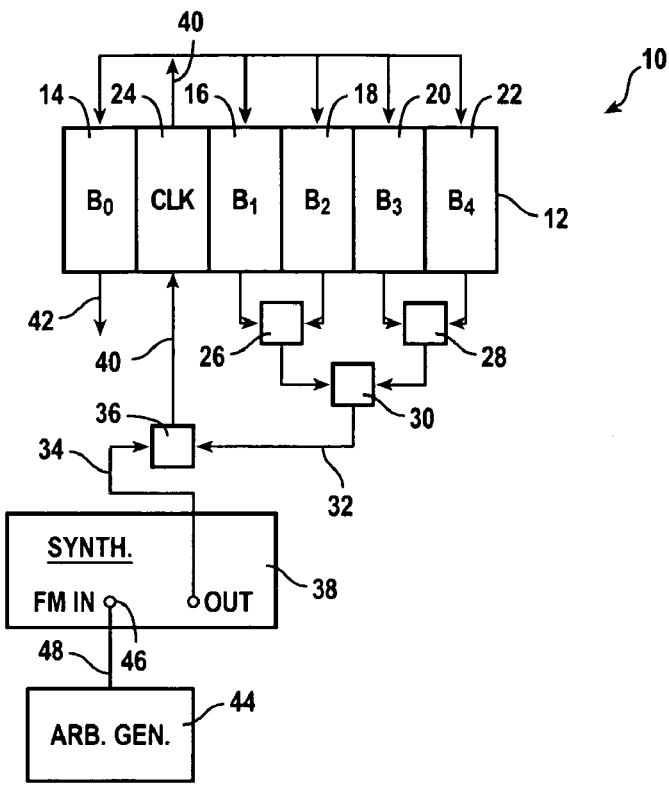
FIG. 1A shows a jitter reference source.

FIG. 1A shows a jitter reference source 10. The jitter reference source includes a multi-channel digital pattern generator 12, such as a parallel BERT ("ParBERT"). One example of a suitable ParBERT is the MODEL 81250 available from AGILENT TECHNOLOGIES, INC., of Palo Alto, Calif. The multi-channel digital pattern generator is alternatively an application-specific integrated circuit ("ASIC") or programmable logic device, such as a field-programmable gate array ("FPGA").

The multi-channel digital pattern generator 12 includes five ParBERT modules ($B_0$, $B_1$, $B_2$, $B_3$, $B_4$, also known as "channels") 14, 16, 18, 20, 22 and a clock module 24. ParBERT module $B_0$ 14 is a digital pattern source, and is clocked by the clock module 24. The other ParBERT modules $B_1$, $B_2$, $B_3$, $B_4$ produce synchronous digital signal patterns at different power levels that are combined in power combiners 26, 28, 30. The correction channels are synchronized to each other and to the digital pattern source module $B_0$ 14. The power combiners are also known as "power splitters", such as two-resistor and three-resistor power splitters/combiners. The four correction ParBERT channels are summed together in the binary ladder arrangement of the power combiners to give a variable compensation voltage that can be changed on a bit-by-bit basis. These ParBERT modules will be referred to as "correction channels" because their outputs are used to correct DDJ in the digital pattern source module 14 and/or a DUT in a test system. Alternatively, the outputs of the correction channels are used to simulate DDJ in a digital signal from the digital pattern source module.

The output 32 of the binary ladder is referred to as "power", but is expressed in Volts, as is common in the art when using high-frequency systems having a characteristic system impedance, such as a fifty-ohm system impedance. For example, if the digital pattern output of $B_1$ varies between $-X$ Volts and X Volts, the digital pattern output of $B_2$ varies between $-X/2$ Volts and X/2 Volts, the digital pattern output of $B_3$ varies between $-X/4$ Volts and X/4 Volts, and the digital pattern output of $B_4$ varies between $-X/8$ Volts and X/8 Volts, these four BERT channels provide a resolution of 1 part in 16 (i.e. $2^n$ steps). More channels would provide greater resolution.

The output 32 of the last power combiner 30 is applied to an external clock signal 34 using a power combiner 36 to produce a perturbed clock signal 40. The external clock signal is a sine wave generated by an external clock source 38, such as a synthesizer or signal generator. The perturbed clock signal 40 is provided to the clock module 24 of the ParBERT, which distributes the perturbed clock signal 40 to the ParBERT modules 14, 16, 18, 20, 22. The digital pattern source module 14 generates a digital signal pattern 42 with timing changes arising from the perturbed clock signal 40. In an alternative embodiment, the digital pattern source module 14 and clock module 24 are not part of the ParBERT, and a different clock signal, such as the unperturbed external clock signal 34, is provided to the other ParBERT modules 16, 18, 20, 22; however, the source output and the correction channels typically share a common timebase.

For example, an unperturbed clock signal is provided to the source output module, which generates a selected digital output pattern that is provided to a DUT (not shown). The digital output from the DUT is measured with a DCA (not shown) and the bit pattern with the worst-case DDJ is determined by evaluating the measured data. The worst-case DDJ is presumed to occur (assuming the DCA has much less DDJ than the digital source and/or the DUT) where the timing of the measured data deviates the most from the average timing. In other words, if the average timing of digital pulses in the measured data is 0.5 ps behind the nominal clock signal, perhaps from cable delay, for example, and a particular data sequence produces 2.5 ps of delay at a pulse edge (transition), then the DDJ is about 2.0 ps. If no other data sequence produces greater than 2.5 ps delay, that particular data sequence produces the worst-case DDJ. Data sequences that are not included in the digital output pattern from the source output module might produce different worst-case DDJ in alternative situations.

A digital level sufficient to correct the DDJ for the worst-case data sequence in the digital output pattern is determined. The appropriate digital level is determined by evaluating the slope of the sine wave output 34 from the external clock source 38 at the clock trigger voltage, and summing sufficient voltage with the sine wave output to phase-shift the timing of the transition to occur closer to the average pulse timing. In the embodiment illustrated in FIG. 1, the value is less than 2X when all correction channels are driven together. For example, if the output of $B_1$ is X Volts, the output of $B_2$ is X/2 Volts, the output of $B_3$ is X/4 Volts and the output of $B_4$ is X/8 Volts, then the output 32 of the binary ladder is 1⅞X Volts. The BERT modules 16, 18, 20, 22 are synchronized and de-skewed so that transitions on each of the correction channels align with a clock edge. If the pulses from the correction channels are sufficiently long, then perfect timing alignment is not required. In general, it is desirable that the sum of the outputs from the correction channels is settled (stable) when the clock trigger voltage is reached.

Figure 2:
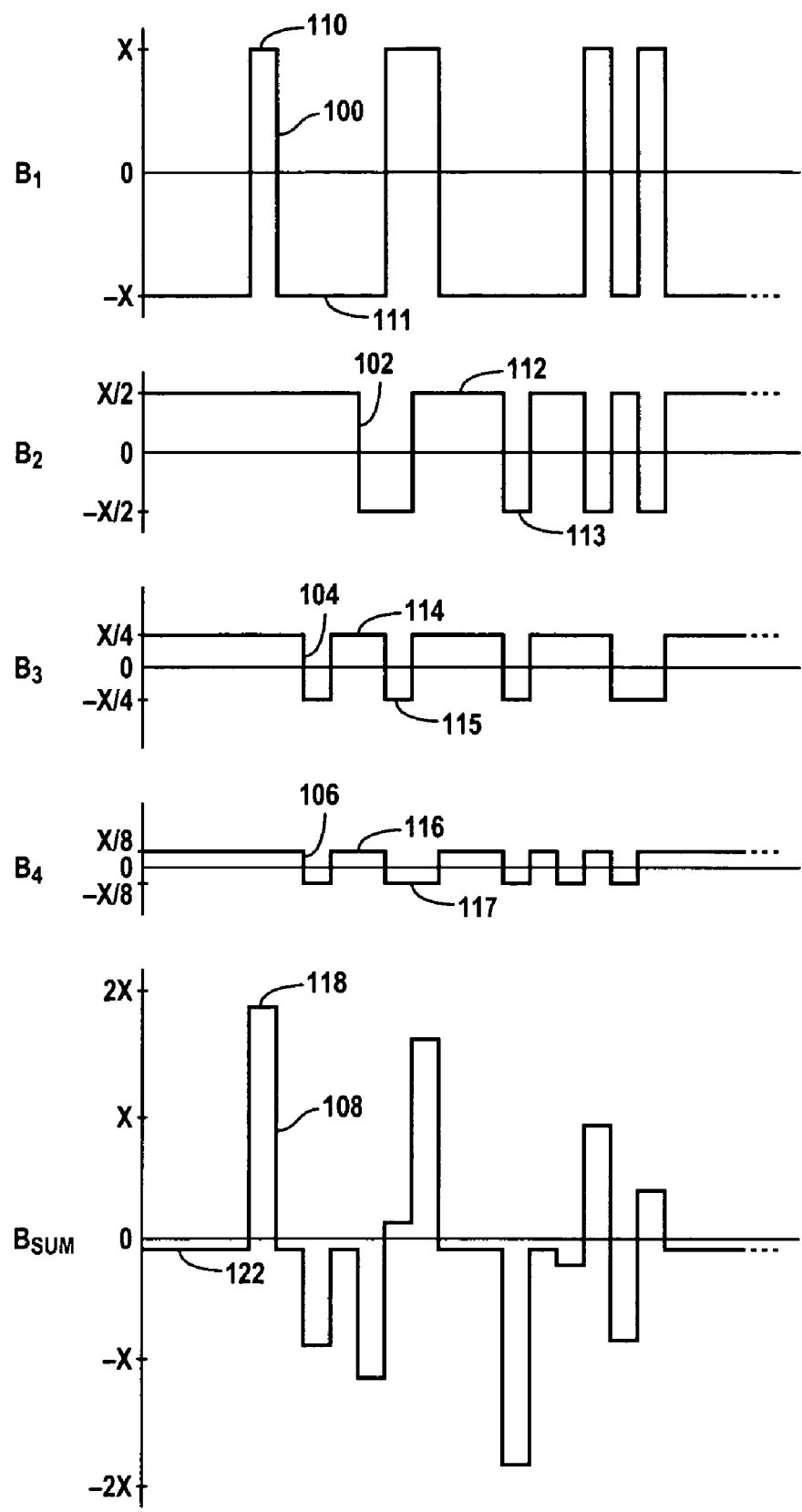
FIG. 2 shows a series of plots representing voltage versus time (both in arbitrary units) for the outputs from the BERT modules, and for the output of the power combiner shown in FIG. 1A.
Figure 3:
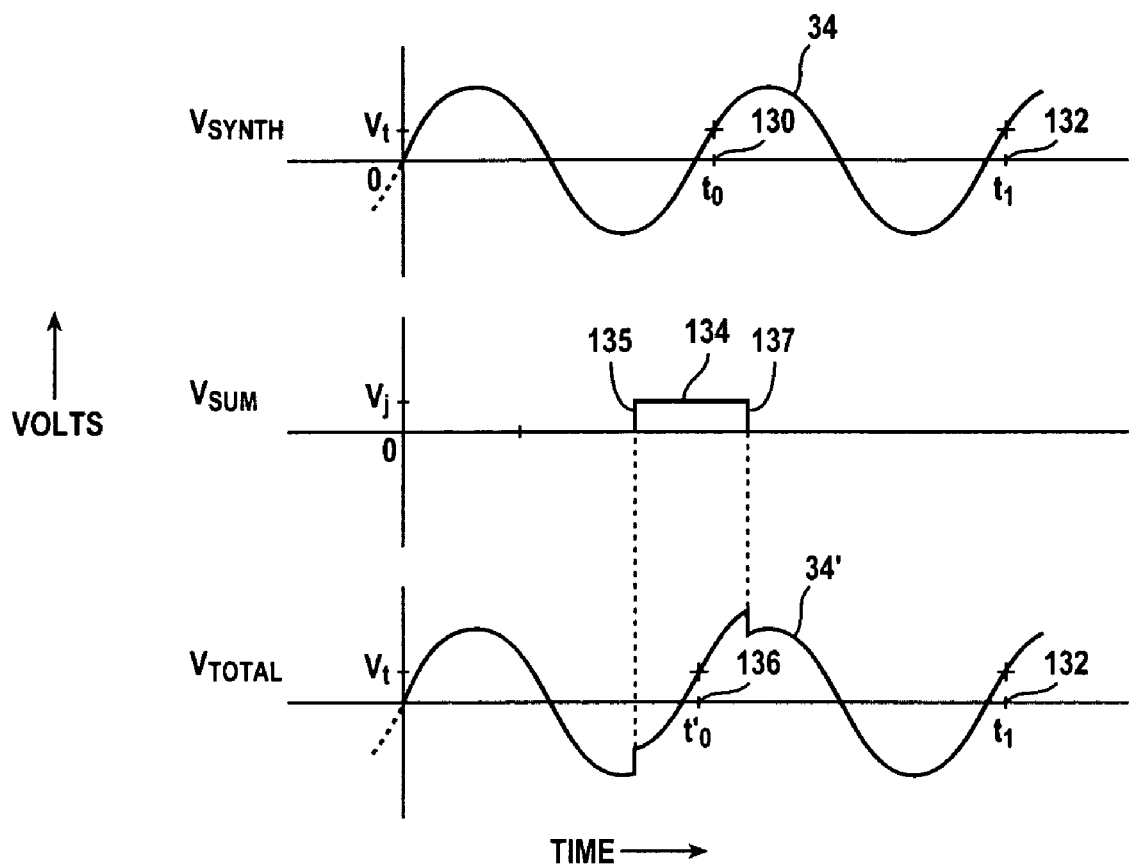
FIG. 3 shows plots of voltage versus time (both in arbitrary units) illustrating how $V_{SUM}$ perturbs the sine wave output $V_{SYNTH}$ of the synthesizer.

The sine wave (external clock signal 34) from the external clock source 38 has a fairly slow risetime. Summing a positive digital voltage level (ref. FIGS. 2 and 3) through the power combiner 36 varies the edge timing of the perturbed clock signal 40 by raising the total voltage of the perturbed clock signal, thus changing the time at which the perturbed clock signal reaches the trigger voltage of the clock module 24. The shift in the clock edge timing depends on the amplitude of the perturbing signal (e.g. voltage of output 32) and the slope of the sine wave near the edge trigger voltage. A steeper slope will have less effect on the edge timing of the clock signal for a given digital voltage level. An alternative to summing multiple digital correction channels and adding them to a clock signal is to use a phase-shifter, such as a varactor-tuned delay line, to shift (perturb) the edge timing of the clock signal from the clock module 24. A phase shifter is particularly desirable at fixed clock frequencies when relatively wide (e.g. about 2 pico-seconds ("ps") to about 20 ps) timing edge shifts are desired.

In an alternative embodiment of the current invention, a quadrature hybrid coupler is used instead of a simple power combiner to produce the perturbed clock signal 40. In this implementation, the quadrature hybrid coupler 36 produces a sine wave output and a cosine wave output from a continuous wave input (e.g. the clock signal 34).

An optional arbitrary waveform generator 44 provides an arbitrary or pseudo-random waveform to the FM input 46 of the synthesizer 38. The arbitrary waveform generator 44 is synchronized with the ParBERT 12. The signal 48 from the arbitrary waveform generator 44 simulates periodic jitter, which is sometimes due to what is called Mux jitter and typically is at a frequency of some small number of bits (e.g. the bit rate divided by 16) and random jitter, which is typically on the order of about every 1000 bits and is typically negligible. In comparison, the DDJ is typically the largest jitter component in a high-bandwidth BERT, and can be about 10 ps at about 2-20 GHz, for example.

Figure 1B:
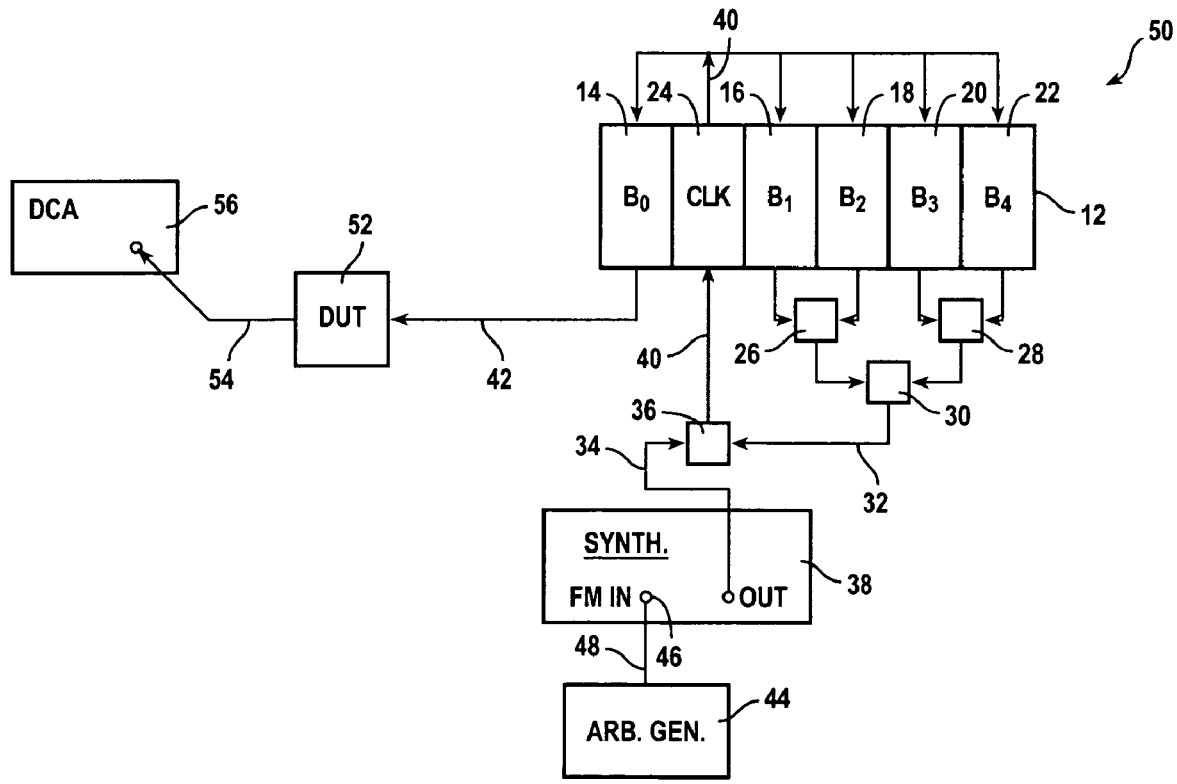
FIG. 1B shows the jitter reference source of FIG. 1A in a digital test system.

FIG. 1B shows the jitter reference source of FIG. 1A in a digital test system 50. The ParBERT modules 14, 16, 18, 20, 22 of the ParBERT 12 receive a common clock signal 40 from the clock module 24. The outputs of the correction channels (ParBERT modules) 16, 18, 20, 22 are summed in a binary ladder including power combiners 26, 28, 30. The output 32 of the binary ladder is combined with the sine wave output 34 from the external clock source 38, to form a perturbed clock signal 40.

The perturbed clock signal is used to introduce a selected amount of jitter into the clock signal 40, and hence into the digital signal pattern 42 generated by the digital pattern source module 14. The digital signal pattern 42 is provided to a DUT 0.52, and the output 54 of the DUT 52 is measured by a DCA 56. The jitter reference source can be used to compensate for jitter in the digital signal pattern 42 that arises from the digital pattern source module 14 and/or the DUT 52, or can introduce a selected amount and type of jitter to digital signal pattern to evaluate the performance of the DUT 52 and/or DCA 56.

FIG. 2 shows a series of plots 100, 102, 104, 106, 108 representing voltage versus time (both in arbitrary units) for the outputs from the BERT modules 16, 18, 20, 22, and for the output 32 of the power combiner 30 shown in FIG. 1A. BERT module $B_1$ produces a digital signal at X Volts 110 or at $-X$ Volts 111, where X is an arbitrary value. Providing positive and negative voltages allows both advancing and delaying the clock trigger timing (ref. FIG. 3 and associated description).

In alternative embodiments, the outputs of the corrections channels all produce a positive voltage or all produce a negative voltage. In other embodiments, the pulses are asymmetrical about 0 Volts, such as from $-\frac{7}{8}X$ Volts to $1\frac{1}{8}X$ Volts, for one or more of the correction channels.

In some embodiments, X is selected that so that the summation of voltage levels from the correction channels provides a phase shift sufficient to compensate for the worst-case DDJ in a digital signal pattern, either from a digital pattern source or from a DUT coupled to a digital pattern source. In other embodiments, X is selected to simulate a known amount of DDJ, such as to provide a known distribution (e.g. a Gaussian distribution having a standard deviation equal to a selected timing shift) of DDJ in a digital signal pattern. In the second case, the versatility of the ParBERT modules allows adding selected jitter on a transition-by-transition (i.e. "bit-wise") basis.

The bit-wise signal is referred to as a "phase-shift signal" in either case for convenience of discussion, whether it is generating a selected digital pattern to simulate jitter or correcting for jitter. In some applications the bit-wise phase-shift signal applies selected amounts of phase shift to only a few bits, or only one bit, in the digital signal pattern. In other applications, the bit-wise phase-shift signal applies selected amounts of phase shift to most bits, or all bits, in the digital signal pattern. In some applications, the phase-shift signal applies selected amounts of phase shift to many bits in the digital signal pattern to simulate or correct for DDJ, and applies a residual amount (e.g. a least-significant bit) of phase shift to the remainder of the bits in the digital signal pattern.

The signals from the correction channels are represented as idealized pulses for convenience of illustration and discussion. ParBERT module $B_2$ produces a digital signal at either X/2 Volts 112 or –X/2 Volts 113. ParBERT module $B_3$ produces a digital signal at X/4 Volts 114 or –X/4 Volts 115, and ParBERT module $B_4$ produces a digital signal at X/8 Volts 116 or –X/8 Volts 117. In an alternative embodiment, the amplitude (voltage) of the digital output signal levels are not $\frac{1}{2}^n$ factors of each other.

The output 32 from the power combiner 30 (ref. FIG. 1) "$B_{SUM}$" (i.e. the output from the binary ladder) is shown in plot 108 ("output plot"). The voltage of the output plot varies according to the sum of the synchronized outputs from ParBERT modules $B_1$-$B_4$. The combined voltages are shown as being added without loss for purposes of discussion. In practice, some amount of signal loss occurs in the binary ladder; however, the loss for each path through the binary ladder is about the same, since each digital signal travels through two power combiners. The output levels of each ParBERT module are individually adjustable.

Some pulses are negative, while some pulses are positive. For example, pulse 188 is 1⅞ Volts, and pulse 120 is –1⅞ Volts. Providing both positive and negative pulses allows advancing and delaying the timing clock transition edges in some embodiments. In other embodiments, it might be desirable to only advance or only delay the clock timing transition edges. In yet other embodiments, the worst-case DDJ timing delay might be different from the worst-case DDJ timing advance, and the pulse amplitudes are not symmetrical about zero Volts. Similarly, the slope of the sine wave from the external clock source might vary near the clock trigger point, and the amplitudes of the BERT modules may be corrected to compensate for this variation. In other cases, it may be desirable to provide a nominal offset, such as an offset equal to the least-significant bit (e.g. –X/8 122), which is optionally compensated for by cable delay in a digital system.

FIG. 2 shows that a wide variety of voltage levels are obtained by various combinations of the pulses from the BERT modules. In this example, eight positive levels (1⅞, 1⅝, etc.) and eight negative levels are possible, for a total of 16 levels between 1⅞X and –1⅞X. Basically, the four ParBERT modules act as a synchronized four-bit digital-to-analog converter that is synchronized to the output module and is capable of operating at very high frequencies (e.g. 10 GHz and above).

In a further embodiment, after determining the correct value for X (i.e. the value sufficient to correct for worst-case DDJ in the digital signal pattern), the digital signal pattern is evaluated on a bit-by-bit basis to determine the appropriate phase-shift, if any, to reduce the DDJ in the digital pattern. This process is typically automated, and the digital outputs of the correction channels are generated according to computer-readable instructions in a computer memory. The computer memory could be incorporated in to a ParBERT, or into an ASIC of FPGA, for example.

In other words, referring to FIG. 1B, the uncorrected digital pattern from the source or source/DUT is measured with the DCA. The average transition edge is determined and the data transition (bit) having the worst-case DDJ is identified. The amplitude of the phase-shift signal that will be combined with the sine wave external clock signal is determined, and amplitudes of the correction channels are set to achieve the desired phase-shift signal. The DDJ of the remaining transitions (bits) are determined, and the correction channels are programmed to provide synchronized outputs (see FIG. 2, plots 100, 102, 104, 106) that sum to provide the desired phase-shift signal (see FIG. 1A, ref. num. 32; FIG. 2, plot 108). Each correction channel reads a data file that produces the desired digital stream. Similarly, the digital pattern source module reads a data file that produces the desired digital pattern output. The correction channels and the digital pattern source module are synchronized so that the desired phase shift to the clock signal to the digital pattern source module occurs at the proper time.

Referring to FIG. 1A, the clock signal 40 generated by the clock module 24 according to the perturbed external clock signal 40 is provided to the correction channels (ParBERT modules 16, 18, 20, 22). The timing of the outputs from the correction modules is typically set so that the combined output 32 is stable (settled) near the trigger voltage of the clock module 24. Offsetting the transitions (bits) in the phase-shift signal from the transitions (bits) in the digital signal pattern is achieved in a variety of ways, such as by cable delays and/or skewing the digital signal pattern behind the phase-shift signal, for example. Thus, jitter on the phase-shift signal does not affect how bits on the digital signal output are phase shifted because the jitter (i.e. transition edges of the phase-shift signal) is relative far away (in time) from the trigger point of the clock.

FIG. 3 shows plots of voltage versus time (both in arbitrary units) illustrating how $V_{SUM}$ (see FIG. 1, ref. num. 32, FIG. 2, ref. num. 108) perturbs the sine wave output $V_{SYNTH}$ of the synthesizer (see FIG. 1, ref. num. 38). The clock module (see FIG. 1, ref. num 24) triggers when the external clock signal reaches a trigger voltage $V_t$ on the rising edge of the sine wave. If the sine wave output 34 is not perturbed, the clock edge occurs at $t_0$ 130. Another clock edge is triggered at $t_1$ 132, when the sine wave crosses $V_t$ on the rising edge again. Alternatively, triggering is done on a falling edge, at a negative voltage, and/or at the zero crossings.

If a digital pulse 134 from the combined digital output ($V_{SUM}$) having an amplitude of $V_j$ is added to the sine wave 34 from the synthesizer, a perturbed sine wave ($V_{TOTAL}$) 34' is created. The trigger voltage now occurs earlier, at $t_0$' 136. The subsequent clock edge still occurs at $t_1$ because no digital pulse occurred over this portion of the sine wave. The addition of the digital pulse raises $V_{TOTAL}$ for the duration of the pulse (pulse width). It is generally desirable that the pulse provide a known phase shift to the clock trigger. The pulse width is exaggerated for purposes of illustration. In particular, the leading edge 135 and trailing edge 137 of the pulse 134 occur well before and after the trigger voltage $t_0'$, in other words, the pulse 134 has settled by the time the clock circuit triggers. Allowing the pulse to settle before $V_{TOTAL}$ reaches $V_t$ provides a known, repeatable offset to $V_{TOTAL}$ and hence repeatable phase shifting.

By adding and subtracting voltages from the sine wave output on a bit-by-bit basis, the clock transition timing of the on the digital signal output from the jitter reference source (see FIG. 1, ref. num. 42) is advanced and delayed on a bit-by-bit basis. If the amplitude of the pulse 134 were higher, the advance would be greater, and if its amplitude were lower, the advance would be less.

II. Exemplary Methods

Figure 4A:
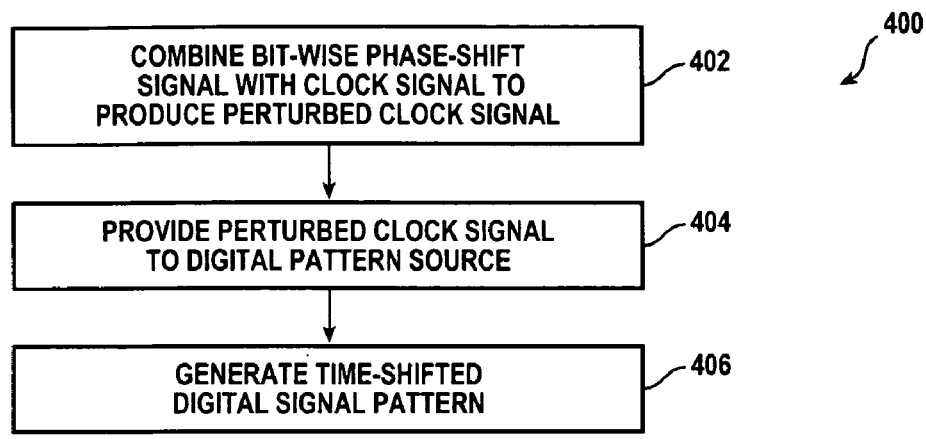
FIG. 4A is a flow chart of a method of phase shifting bits in a digital signal pattern.

FIG. 4A is a flow chart of a method 400 of phase shifting bits in a digital signal pattern. A bit-wise phase-shift signal is applied to a clock signal to produce a perturbed clock signal (step 402). The perturbed clock signal is provided to a digital pattern source (step 404) and the digital pattern source generates a shifted digital signal pattern (step 406) wherein at least one bit is selectively phase-shifted according to the bit-wise phase-shift signal. Referring to FIG. 2, the bit-wise phase-shift signal (e.g. $B_{SUM}$, plot 108) provides a selected digital level for transitions associated with bit patterns in digital signal pattern, such as from the digital source module 14 in the ParBERT shown in FIG. 1A. These transitions occurs between bits on the digital signal pattern, hence the phase-shift signal is bit-wise. It is not necessary to apply a correction (phase shift) to each bit (since the digital signal pattern may include portions of several 1's and several 0's, with no transitions between bits of the same digital value). Similarly, it is not necessary to apply a correction to each transition, since some transitions might not generate significant DDJ, such as DDJ below the resolution limit of the bit-wise phase-shift signal.

Figure 4B:
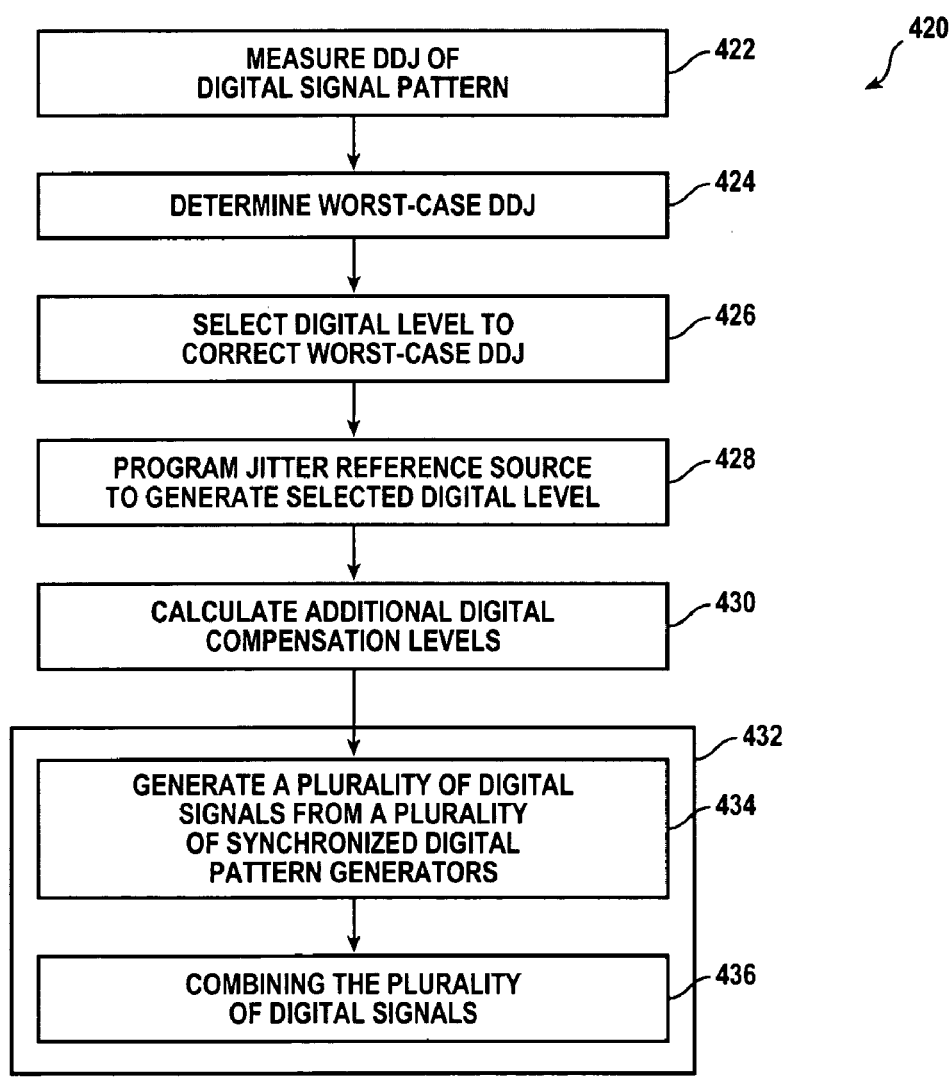
FIG. 4B is a flow chart of a method of phase shifting bits in a digital signal pattern to compensate for DDJ in the digital signal pattern.

FIG. 4B is a flow chart of a method 420 of phase shifting bits in a digital signal pattern to compensate for DDJ in the digital signal pattern. The DDJ of the digital signal pattern is measured (step 422) and the worst-case DDJ is determined (step 424). For example, the transition in the digital signal pattern that produces the greatest deviation from the average transition timing is determined. A digital level sufficient to correct the worst-case DDJ is selected (step 426). The digital level is selected according to the timing error of the transition and the sensitivity of clock trigger timing when the digital level is added to or subtracted from the external clock signal.

In a further embodiment, a jitter reference source is programmed to generate the digital level in the bit-wise phase-shift signal (step 428). In a yet further embodiment, digital signal levels sufficient to compensate a plurality of data-dependent jitter transitions in the digital signal pattern are calculated (step 430). The jitter reference source generates the bit-wise phase-shift signal to compensate (i.e. reduce the jitter of) the plurality of DDJ transitions in the digital signal pattern (step 432). In a particular embodiment, the step of generating the bit-wise phase-shift signal comprises substeps of generating a plurality of digital signals from a plurality of synchronized digital pattern generators (step 434) and combining the plurality of digital signals (step 436), such as with a binary ladder.

While the preferred embodiments of the present invention have been illustrated in detail, it should be apparent that modifications and adaptations to these embodiments might occur to one skilled in the art without departing from the scope of the present invention as set forth in the following claims.

What is claimed is:

1. A method of phase shifting bits in a digital signal pattern comprising:
    applying a bit-wise phase-shift signal to a clock signal to produce a perturbed clock signal;
    providing the perturbed clock signal to a digital pattern source; and
    generating a shifted digital signal pattern wherein at least one bit is selectively phase-shifted according to the bit-wise phase-shift signal;
    wherein the bit-wise phase-shift signal comprises a sum of a plurality of digital signals from a plurality of digital pattern generators, the plurality of digital signals are combined in a binary ladder.

2. The method of claim 1 wherein the plurality of digital pattern generators
    and the digital pattern source form at least a portion of an integrated circuit.

3. The method of claim 2 wherein the integrated circuit comprises an application-specific integrated circuit.

4. The method of claim 2 wherein the integrated circuit comprises a programmable logic device.

5. A method of phase shifting bits in a digital signal pattern comprising:
    applying a bit-wise phase-shift signal to a clock signal to produce a perturbed clock signal;
    providing the perturbed clock signal to a digital pattern source; and
    generating a shifted digital signal pattern wherein at least one bit is selectively phase-shifted according to the bit-wise phase-shift signal;
    wherein the bit-wise phase-shift signal comprises a sum of a plurality of digital signals from a plurality of digital pattern generators;
    wherein the plurality of digital signals are combined in a binary ladder; and
    wherein the plurality of digital pattern generators comprises bit error ratio tester modules.

6. The method of claim 5 wherein the digital pattern source comprises a bit error ratio tester module.

7. The method of claim 5 wherein the bit error ratio tester modules are part of a parallel bit error ratio tester and the digital pattern source comprises a bit error ratio tester module in the parallel bit error ratio tester.

8. A method of phase shifting bits in a digital signal pattern comprising:
    applying a bit-wise phase-shift signal to a clock signal to produce a perturbed clock signal;
    providing the perturbed clock signal to a digital pattern source; and
    generating a shifted digital signal pattern wherein at least one bit is selectively phase-shifted according to the bit-wise phase-shift signal;
    wherein the step of applying the bit-wise phase-shift signal to the clock signal comprises adding the bit-wise phase-shift signal to the clock signal in a resistive combiner.

9. A method of phase shifting bits in a digital signal pattern comprising:
    applying a bit-wise phase-shift signal to a clock signal to produce a perturbed clock signal;

providing the perturbed clock signal to a digital pattern source; and generating a shifted digital signal pattern wherein at least one bit is selectively phase-shifted according to the bit-wise phase-shift signal;

wherein the step of applying the bit-wise phase-shift signal to the clock signal comprises providing the clock signal to a quadrature hybrid coupler, attenuating at least a first output of the quadrature hybrid coupler according to the bit-wise phase-shift signal, and adding the first output of the quadrature hybrid coupler to a second output of the quadrature hybrid coupler.

10. A method of phase shifting bits in a digital signal pattern comprising:

applying a bit-wise phase-shift signal to a clock signal to produce a perturbed clock signal;

providing the perturbed clock signal to a digital pattern source; and generating a shifted digital signal pattern wherein at least one bit is selectively phase-shifted according to the bit-wise phase-shift signal; and further comprising steps, prior to the step of applying the bit-wise phase-shift signal, of:

measuring data-dependent jitter of the digital signal pattern;

determining a worst-case data dependent jitter transition; and selecting a digital level sufficient to correct the worst-case data-dependent jitter transition.

11. The method of claim 10 further comprising the step of:

programming a jitter reference source to generate the digital level in the bit-wise phase-shift signal.

12. The method of claim 11 further comprising steps, after the step of calculating a digital level, of:

calculating digital signal levels sufficient to compensate a plurality of data-dependent jitter transitions in the digital signal pattern;

generating the bit-wise phase-shift signal to compensate the plurality of data-dependent jitter transitions in the shifted digital signal pattern.

13. The method of claim 12 wherein the step of generating the bit-wise phase-shift signal comprises sub-sets of:

generating a plurality of digital signals from a plurality of synchronized digital pattern generators; and combining the plurality of digital signals.

14. The method of claim 13 wherein in a digital pattern generator of the plurality of synchronized digital pattern generators provides a voltage level different from each of a remainder of the plurality of digital pattern generators.

15. A method of phase shifting bits in a digital signal pattern comprising:

applying a bit-wise phase-shift signal to a clock signal to produce a perturbed clock signal;

providing the perturbed clock signal to a digital pattern source; and generating a shifted digital signal pattern wherein at least one bit is selectively phase-shifted according to the bit-wise phase-shift signal;

further comprising steps, prior to the step of combining the bit-wise phase-shift signal, of: measuring data-dependent jitter of the digital signal pattern;

determining a worst-case data dependent jitter transition; and selecting a digital level sufficient to correct the worst-case data-dependent jitter transition;

further comprising the step of:

programming a jitter reference source to generate the digital level in the bit-wise phase-shift signal and further comprising steps, after the step of calculating a digital level, of:

calculating digital signal levels sufficient to compensate a plurality of data-dependent jitter transitions in the digital signal pattern;

generating the bit-wise phase-shift signal to compensate the plurality of data-dependent jitter transitions in the shifted digital signal pattern, wherein a digital pattern generator of the plurality of synchronized digital pattern generators provides a voltage level different from each of a remainder of the plurality of digital pattern generators; and wherein a first digital pattern generator produces a first voltage level and a second digital pattern generator produces a second voltage level, the first voltage level being 2n times the second voltage level, where n is an integer.

* * * * *